(12) United States Patent
Klein

(10) Patent No.: US 6,791,637 B2
(45) Date of Patent: Sep. 14, 2004

(54) LIQUID CRYSTAL DISPLAY HAVING LIGHT PIPE ILLUMINATION

(75) Inventor: Susanne Klein, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 116 days.

(21) Appl. No.: 10/083,505

(22) Filed: Feb. 27, 2002

(65) Prior Publication Data

US 2002/0122315 A1 Sep. 5, 2002

(30) Foreign Application Priority Data

Mar. 2, 2001 (GB) .............................................. 0105206

(51) Int. Cl.⁷ .......................................... G02F 1/1335
(52) U.S. Cl. ............................ 349/62; 349/58; 349/61; 349/68; 362/31; 362/561; 385/901
(58) Field of Search ............................ 349/58, 61, 62, 349/63, 65, 68, 159, 196, 197; 362/31, 561; 385/16, 17, 18, 901

(56) References Cited

U.S. PATENT DOCUMENTS

| | | | | |
|---|---|---|---|---|
| 4,720,172 A | * | 1/1988 | Baker .......................... | 349/106 |
| 4,948,229 A | * | 8/1990 | Soref .......................... | 385/16 |
| 4,989,933 A | * | 2/1991 | Duguay et al. ................ | 385/31 |
| 5,016,956 A | * | 5/1991 | Gasparaitis et al. ......... | 385/115 |
| 5,099,343 A | * | 3/1992 | Margerum et al. ............. | 349/63 |
| 5,479,276 A | | 12/1995 | Herbermann ................. | 359/48 |
| 6,407,785 B1 | * | 6/2002 | Yamazaki .................... | 349/113 |

FOREIGN PATENT DOCUMENTS

| | | |
|---|---|---|
| EP | 0 520 368 A2 | 12/1992 |
| GB | 2 246 231 | 1/1992 |

OTHER PUBLICATIONS

H. Yuan et al., "Waveguide Based Liquid Crystal Display", Mol. Cryst. Liq. Cryst., 1999, pp. 281–288, vol. 331, Gordon and Breach Science Publishers, Malaysia.

* cited by examiner

Primary Examiner—Robert H. Kim
Assistant Examiner—Michael H Caley
(74) Attorney, Agent, or Firm—Foley & Lardner

(57) ABSTRACT

The present invention relates to display, in particular to a liquid crystal display illuminated by ambient light. The display has a display area, and a light guide system for providing light to the display area, the light guide system comprising: a planar light guiding layer comprised of liquid crystal material and having a light emitting surface and a plurality of side faces disposed around the light emitting surface; a plurality of light pipes, each light pipe having a collector end for collecting ambient light and an output end, the output ends being arranged along the side faces of the light guiding layer so as to introduce the collected light into the guiding medium. The output ends of the light pipes are distributed evenly along each side face of the light guiding layer so as to provide homogeneous illumination to the display area.

4 Claims, 2 Drawing Sheets

LIQUID CRYSTAL DISPLAY HAVING LIGHT PIPE ILLUMINATION

The present invention relates to display, in particular to a liquid crystal display illuminated by ambient light.

Some displays, such as liquid crystal displays, can be lit by a back light. The back light may need to be powerful, particularly if the optical efficiency of the display is low. Therefore, if the back light is part of a lap top computer or other portable device, a heavy battery may be required to power the back light, which may be inconvenient.

Displays are known that operate without a back light by reflecting ambient light, the reflectivity of the display being different at different points on the screen, so that reflected light forms an image. However, a substantial amount of ambient light incident on the display may be lost due to absorption within the display. Furthermore, the user of the display may be tempted to point the display in the direction where the ambient light is strongest, which will lead to specular reflection of the ambient light off the display, thereby making the display less effective.

Another type of display which uses a planar waveguide to provide light through a liquid crystal layer is disclosed in a paper titled "Waveguide Based Liquid Crystal Display", by H. Yuan and P. Palffy-Muhoray, published in Mol. Cryst. Liq. Cryst., 1999, Vol. 331, pp.281–288. This uses total internal reflection between the liquid crystal and one planar substrate that bounds the liquid crystal, instead of birefringence between crossed polarizers. In this planar waveguide lit display, one or more light sources must then be provided to couple light into the waveguide, for example at the periphery of a display. Light is then guided by the substrate and then deflected out of activated areas of the liquid crystal. This provides an efficient optical structure with a high viewing angle. It may, however, be difficult to provide one or more light sources around the periphery of the display to illuminate the waveguide.

According to one aspect of the present invention, there is provided a display having a display area, and a light guide for providing light to the display area, the light guide comprising:

a planar light guiding medium having a light emitting surface and one or more side faces disposed around the light emitting surface;

a plurality of light pipes, each light pipe having a collector end for collecting light and an output end, the output ends being arranged along the side faces so as to introduce the collected light into the guiding medium;

wherein the output ends of the light pipes are distributed along the or each side face.

The light pipes may then be distributed according to the amount of light needed across the display, or in a particular area of the display. In a preferred embodiment of the invention, the light pipes are distributed evenly along the or each side face.

The light guiding medium will channel light therealong but will allow some light to escape through the light emitting surface to illuminate the display area. It will be understood that the term planar light guiding medium will include a medium with some curvature, provided that the curvature is sufficiently small that to allow the guiding medium to channel light therein.

Because the output ends of the light pipes are distributed evenly along the side faces of the light guiding medium, light will be emitted from the light emitting surface more evenly. It will be appreciated that the light pipes outputs need not be distributed at the same intervals around all the side faces of the light guiding medium, and that if the light guiding medium is rectangular, the intervals between light pipe outputs along the long sides may be different from the intervals along the short sides of the light guiding medium.

Preferably, the collector ends of the light pipes will be distributed in a spaced apart fashion over a light collecting area, the position of the collector ends on the light collecting area being scrambled relative to the position of the corresponding output ends on the side faces of the light guiding medium. Because of this, if a portion of the light collecting area is obscured, the light emitted through the light emitting area will be diminished in a more uniform manner, and the likelihood of a shadow being formed in the display area will be reduced.

There may be some short range order between the positions of the output ends and the positions corresponding light collector ends. The light pipes may be grouped in pairs, the light output ends of each pair being adjacent to one another on a side face, and the collector ends of each pair being adjacent to one another on the collecting area. However, a group of light pipes with neighbouring or nearby collector ends will preferably have output ends that are located on different portions of a side surface or, on different side surfaces.

The light guiding medium will preferably have a planar back surface, and a reflecting layer may be provided on the back surface of the light guiding medium, so as to increase the amount of light emitted through the light emitting surface.

In a preferred embodiment, means are provided for applying an electrical signal to the guiding medium in one or more localised areas, and the guiding medium is responsive to the electrical signal such that the optical properties of the optical medium are changed in each localised area where the electrical signal is applied, with the result that in the localised areas where the electrical signal is applied, light travelling along the guiding medium exits the guiding medium through the light emitting surface, and where the electrical signal is not applied, light within the light guiding medium is channelled therealong.

An image can be formed by applying the electrical signal at the points where the desired image is light, the remaining area of the display appearing dark.

The electrical signal will preferably be in the form of a voltage applied across the guiding medium, but the electrical signal may superposed on a background voltage level, such that the electrical signal at a point on the light guiding medium results in the absence of a voltage being applied at that point.

The guiding medium may have a refractive index whose value is changeable between a first value and a second value when an electrical signal is applied, the guiding medium having an index matching layer whose refractive index is close to the first value. In one embodiment, the refractive index of the guiding medium will be more closely matched to the refractive index of the index matching layer at a point where an electrical signal is applied, and light will be emitted through the light emitting layer at that point. The light guiding medium will preferably be liquid crystal material, since its refractive index for at least one polarisation of light can easily be changed by applying an electric field.

So that the image produced by the screen can be viewed more easily by a person in front of the screen, a light scattering layer will preferably be provided between the light emitting surface and the light guiding layer.

Since the liquid crystal material will normally be birefringent, and since the refractive index for only one polarisation of light may be changed between a fist value and a second value by the electrical signal, a quarter wave plate or other polarisation rotating element may be provided at each side face of the light guiding medium, in order to increase the amount of light which can be affected by the change in refractive index of the liquid crystal material. A semi-reflecting mirror will preferably be provided on the outer surface of each quarter wave plate, so that light of one polarisation that is internally incident on a side face will pass through a quarter wave plate a first time, will be reflected by the semi-reflecting mirror, and will then pass through the quarter wave plate a second time, emerging from the quarter wave plate with a second polarisation.

The collector ends of at least some of the light pipes may be secured together in a bunch having a collector face, and means may be provided for temporarily securing the bunch in an orientation relative to the display area. If the ambient light from a particular direction is particularly bright, a user will then be able to orient the bunch such that the connector ends face in the direction where the ambient light is bright, thereby increasing the brightness of the screen. Alternatively, the end of the bunch may be optically coupled to an electrical light source.

In a preferred embodiment, the display will be secured in a casing, and the collector ends will be distributed over at least a portion of the external surface of the casing. The display may be secured to the casing of a lap top computer, or other portable electronic device of the type having a display, such as a mobile telephone.

The light pipes will preferably be formed from optic fibres.

The invention will now be further described, by way of example, with reference to the following drawings in which.

Figure 1:
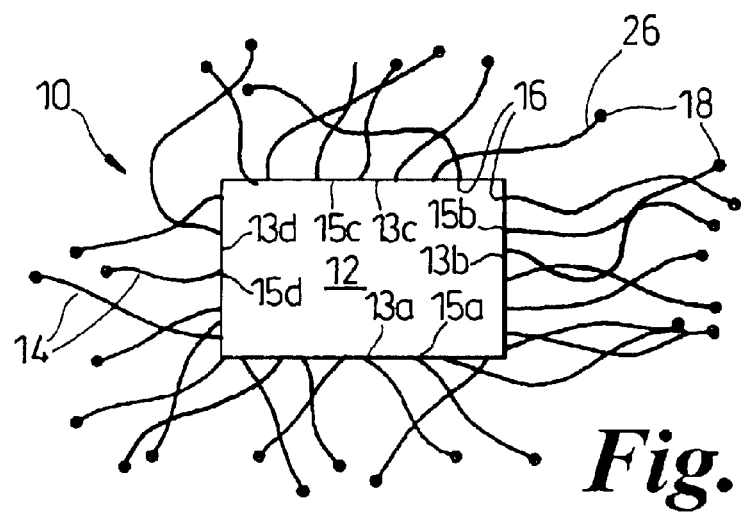
FIG. 1 shows a plan view of a display having optic fibre with collector ends according to the invention.

In FIG. 1, there is shown a display 10 having a display area 12 bounded by four sides 13a, 13b, 13c, 13d. A plurality of optic fibres 14 are provided for guiding light towards the display area 12. Each fibre 14 has a collector end 18 through which light can enter the fibre 14 and a light output end 16 through which the collected light exits the fibre 14.

Figure 2:
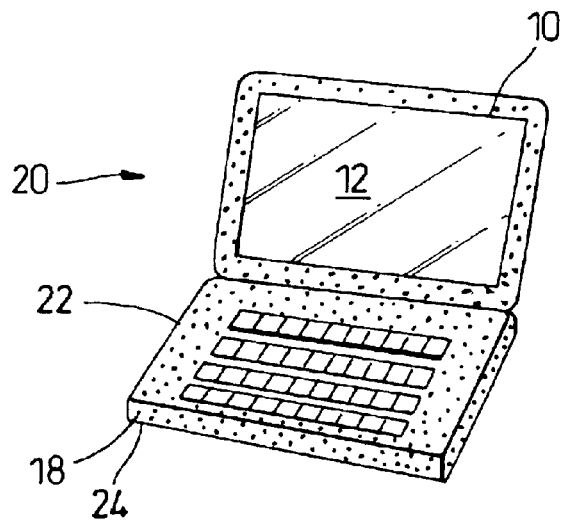
FIG. 2 shows a front view of a laptop computer with the display of FIG. 1, where the collector ends are distributed over the external surface of the laptop casing.
Figure 3:
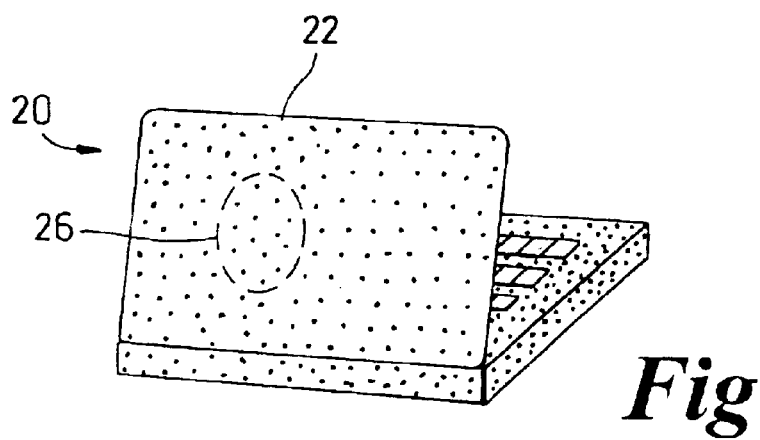
FIG. 3 shows a back view of the laptop computer of FIG. 2.

In FIGS. 2 and 3, there is shown an electronic device, here a laptop computer 20 with the display 10 mounted in the casing 22 of the computer 20. The casing 22 has a plurality of apertures 24, in each of which there is mounted the collector end 18 of an optic fibre 14. Ambient light incident on the casing 20 of the computer is directed by the optic fibres 14 onto the display area 12 of the display 10.

The collector ends 18 of the fibres 14 are distributed on the casing 18 such that there is no relationship between the position of the output ends 16 and the position of the collector ends 18. Collector ends 18 which lie close together, for example within the dashed loop 26 in FIG. 3, will have corresponding output ends 16 which are located on different sides of the display area 12. If the collector ends 18 within the dashed loop are obscured, for example by a nearby object or a human hand, the light exiting the display area 12 will be uniformly diminished, rather than a shadow being formed on the display area 12.

Figure 4:
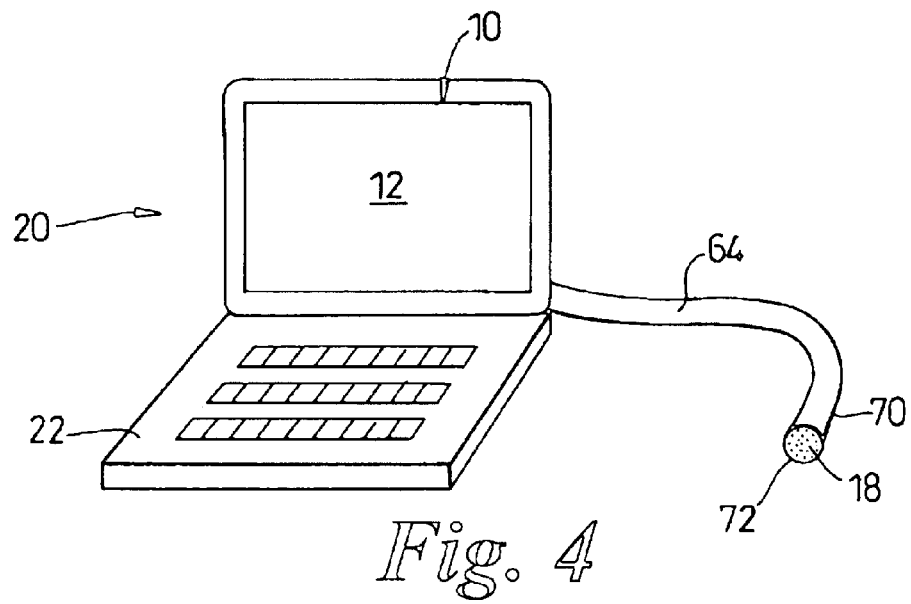
FIG. 4 shows a laptop computer with the display of FIG. 1, where the optic fibres are secured together in a bundle.

In an embodiment shown in FIG. 4, at least some of the fibres 14 are bunched together in a semi-rigid cladding 64 extending from the casing 22. At one end of the cladding 64, the collector ends 18 form a bunch 70 having a collecting surface 72, the other end of the cladding 64 being secured to the casing 22. If the ambient light is strongest in one direction, the collecting surface 72 can be oriented in that direction in order to increase the amount of light provided to the display 12, and the semi-rigid cladding will support the collecting surface 72 in that orientation.

Figure 5:
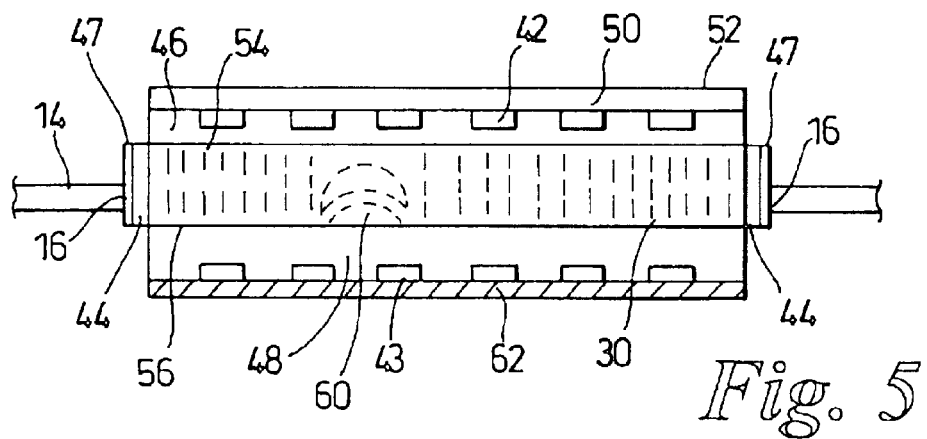
FIG. 5 shows a cross sectional view of the display in FIG. 1 in one embodiment; and, FIG. 6 shows a cross sectional view of a portion of the display in FIG. 1, in another embodiment.

In FIG. 5, there is shown, schematically, a cross sectional view through the display 10. The display 10 has a layer of liquid crystal (LC) material 30. A plurality of transparent upper address lines 42 and lower address lines 43 are respectively provided above and below the LC layer 30 in order to apply an electric field in at least one localised area of the LC layer 30. An upper planarizing layer 46 is provided between the upper address lines 42 and the LC layer 30, and a lower planarizing layer 48 is provided between the LC layer 30 and the lower address lines 43. A layer of glass 50 is provided above the upper address lines 42, the outer surface 52 of the glass layer acting as a light emitting surface.

Where an electric field is not applied to the LC layer, light is channelled by the LC layer 30 such that is propagates along the layer 30 by undergoing multiple total internal reflections at the interfaces 54,56 between the LC layer 30 and the upper and lower planarizing layers 46,48 respectively. In a localised region 60 where an electric field is applied by a voltage across the address lines 42,43, the refractive index of the LC layer 30 is changed, such that total internal reflection no longer occurs at the upper boundary 54 and the lower boundary 56, and in that localised region 60, light exits the LC layer 30 and reaches the light emitting surface 52, thereby forming a bright region in the display area 12. A mirror 62 is provided below the lower address lines 43 so that light that leaves the LC layer through the lower boundary 56 is reflected back up, through the LC layer 30, and through the light emitting surface 52.

The glass layer 50 and/or the upper planarizing layer 46 will scatter the light passing therethrough, so that at least some of the light leaving the light emitting surface 52 leaves the surface in a normal or near normal direction.

The LC layer 30 has a four side faces 15a, 15b, 15c, 15d, against each of which there lies a quarter wave plate 44 followed by a semi-reflective mirror 47. The output end 16 of each fibre lies against a semi-reflective mirror, facing towards a side face of the LC layer 30. Light exiting the output end 16 of a fibre 14 first passes through the semi-reflecting mirror 47, and then though the quarter wave plate 44, and into the LC layer 30.

Light that has travelled across the LC layer 30 will be reflected at least in part by a semi-reflected mirror 47, passing twice through the quarter wave plate 44 before marking a further pass through the LC layer 30. The quarter wave plate 44 will rotate the polarisation of the light passing therethrough, in order to increase the amount of light emitted through the light emitting surface 52 if the refractive index of the LC layer 30 is only changeable for one polarisation of light.

Figure 6:
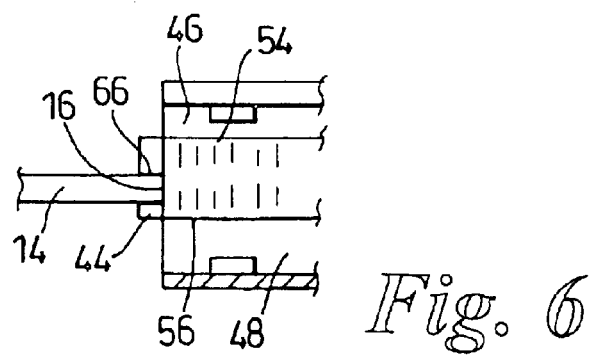

In another embodiment, shown schematically in FIG. 6, the output end 16 of each fibre 14 passes through an aperture 66 in the quarter wave plate layer 44, such that light entering the LC layer 30 from the optic fibre 14 does not pass through the quarter wave plate layer.

It will be appreciated from the above description that the present invention provides a simple and compact way of collecting ambient light in order to illuminate a portable display, thereby reducing the need for a battery powered light source.

What is claimed is:

1. A display having a display area, and a light guide for providing light to the display area, the light guide comprising:
   a planar light guiding medium formed of liquid crystal material and having a light emitting surface and one or more side faces disposed around the light emitting surface;
   a plurality of light pipes, each light pine having a collector end for collecting light and an output end, the output ends being arranged along the side faces so as to introduce the collected light into the guiding medium;
   wherein the output ends of the light pipes are distributed along the or each side face
   wherein the collector ends of the light pipes are distributed over a light collecting area and wherein the position of the collector ends on the light collecting area is scrambled relative to the position of the corresponding output ends on the side faces of the light guiding medium, wherein the display is secured in a casing, and the collector ends are distributed over at least a portion of the external surface of the casing.

2. A display having a display area, and a light guide for providing light to the display area, the light guide comprising:
   a planar light guiding medium formed of liquid crystal material and having a light emitting surface and one or more side faces disposed around the light emitting surface;
   a plurality of light pipes, each light pipe having a collector end for collecting light and an output end, the output ends being arranged along the side faces so as to introduce the collected light unto the guiding medium;
   wherein the output ends of the light pipes are distributed along the or each side face, and wherein means are provided for applying an electrical signal to the guiding medium in one or more localised areas; and,
   the guiding medium is responsive to the electrical signal such that the optical properties of the optical medium are changed in each localised area where the electrical signal is applied, with the result that in the localised areas where the electrical signal is applied, light travelling along the guiding medium exits the guiding medium through the light emitting surface, and where the electrical signal is not applied, light within the light guiding medium is channelled therealong, and
   wherein a scattering layer is provided between the light emitting surface and the light guiding medium.

3. A display having a display area, and a light guide for providing light to the display area, the light guide comprising:
   a planar light guiding medium formed of liquid crystal material and having a light emitting surface and one or more side faces disposed around the light emitting surface;
   a plurality of light pipes, each light pipe having a collector end for collecting light and an output end, the output ends being arranged along the side faces so as to introduce the collected light into the guiding medium;
   wherein the output ends of the light pipes are distributed along the or each side face, wherein the collector ends of at least some of the light pipes are secured together in a bunch having a collector face, and means are provided for temporarily securing the bunch in an orientation relative to the display area.

4. An electronic device comprising:
   a casing, a display with a display area secured relative to the casing, and a light guide for providing light to the display area, the light guide having:
      a planar light guiding medium comprising a liquid crystal material and having a light emitting surface and one or more side faces disposed around the light emitting surface;
      a plurality of light pipes, each light pipe having a collector end for collecting light and an output end, the output ends being arranged along the side faces so as to introduce the collected light into the guiding medium;
      wherein the output ends of the light pipes are distributed evenly along the or each side face.

* * * * *